United States Patent
Chelin et al.

(10) Patent No.: US 9,003,760 B2
(45) Date of Patent: Apr. 14, 2015

(54) ACOUSTIC PROCESSING PANEL, MORE PARTICULARLY ADAPTED FOR AN AIR INTAKE IN AN AIRCRAFT NACELLE

(75) Inventors: Frédéric Chelin, Encausse (FR); Thierry Surply, Cornebarrieu (FR); Dominique Haro, Tournefeuille (FR); Fabrice Gantie, Toulouse (FR); David Lambert, Cugnaux (FR)

(73) Assignee: Airbus Operations SAS, Toulouse (FR)

( * ) Notice: Subject to any disclaimer, the term of this patent is extended or adjusted under 35 U.S.C. 154(b) by 924 days.

(21) Appl. No.: 13/145,685

(22) PCT Filed: Jan. 29, 2010

(86) PCT No.: PCT/FR2010/050144
§ 371 (c)(1),
(2), (4) Date: Dec. 2, 2011

(87) PCT Pub. No.: WO2010/089496
PCT Pub. Date: Aug. 12, 2010

(65) Prior Publication Data
US 2012/0090693 A1    Apr. 19, 2012

(30) Foreign Application Priority Data
Feb. 3, 2009   (FR) ...................................... 09 50663
Sep. 23, 2009  (FR) ...................................... 09 56552

(51) Int. Cl.
*B64D 15/04* (2006.01)
*F02C 7/047* (2006.01)
*F02C 7/045* (2006.01)
*B64D 33/02* (2006.01)
*F02K 1/82* (2006.01)

(52) U.S. Cl.
CPC ................ *B64D 33/02* (2013.01); *B64D 15/04* (2013.01); *F02C 7/045* (2013.01); *F02C 7/047* (2013.01); *F02K 1/827* (2013.01); *B64D 2033/0206* (2013.01); *B64D 2033/0233* (2013.01)

(58) Field of Classification Search
CPC ............ F02C 7/04; F02C 7/047; F02C 7/045; F02C 7/24; F02C 6/04; F05D 2250/283; F05D 2260/208; F05D 2260/96; B64D 15/00; B64D 15/02; B64D 15/04; B64D 15/06; B64D 33/02; B64D 2033/0206; B64D 2033/0233
USPC ......... 60/782, 785, 39.093, 39.091; 137/15.1; 244/134 R, 134 A, 134 B, 134 E, 53 B
See application file for complete search history.

(56) References Cited

U.S. PATENT DOCUMENTS

| | | | |
|---|---|---|---|
| 5,841,079 A * | 11/1998 | Parente ....................... | 181/214 |
| 2002/0139899 A1 | 10/2002 | Porte | |
| 2002/0139900 A1 | 10/2002 | Porte et al. | |
| 2002/0179773 A1 * | 12/2002 | Breer et al. ............... | 244/134 R |
| 2006/0219475 A1 | 10/2006 | Olsen et al. | |
| 2010/0181420 A1 | 7/2010 | Porte et al. | |

FOREIGN PATENT DOCUMENTS

| EP | 1 232 944 A1 | 8/2002 |
|---|---|---|
| EP | 1 232 945 A1 | 8/2002 |
| FR | 2 917 067 A1 | 12/2008 |

OTHER PUBLICATIONS

International Search Report, dated Jun. 1, 2010, from corresponding PCT application.

* cited by examiner

*Primary Examiner* — Andrew Nguyen
(74) *Attorney, Agent, or Firm* — Young & Thompson

(57) ABSTRACT

An acoustic treatment panel that is connected to an air intake of an aircraft nacelle, includes at least one acoustically resistive structure (30) and a reflective layer (32), between which are located—in a direction that is essentially perpendicular to the longitudinal direction of the nacelle—bands (34) of alveolar cells spaced in such a way as to allow the passage of hot air provided for a frost treatment, characterized in that it includes pipes (36) for hot air that are each delimited by at least one partition that extends from the acoustically resistive layer (30) up to the reflective layer (32) in such a way as to insulate the bands (34) of cells in the longitudinal direction.

12 Claims, 4 Drawing Sheets

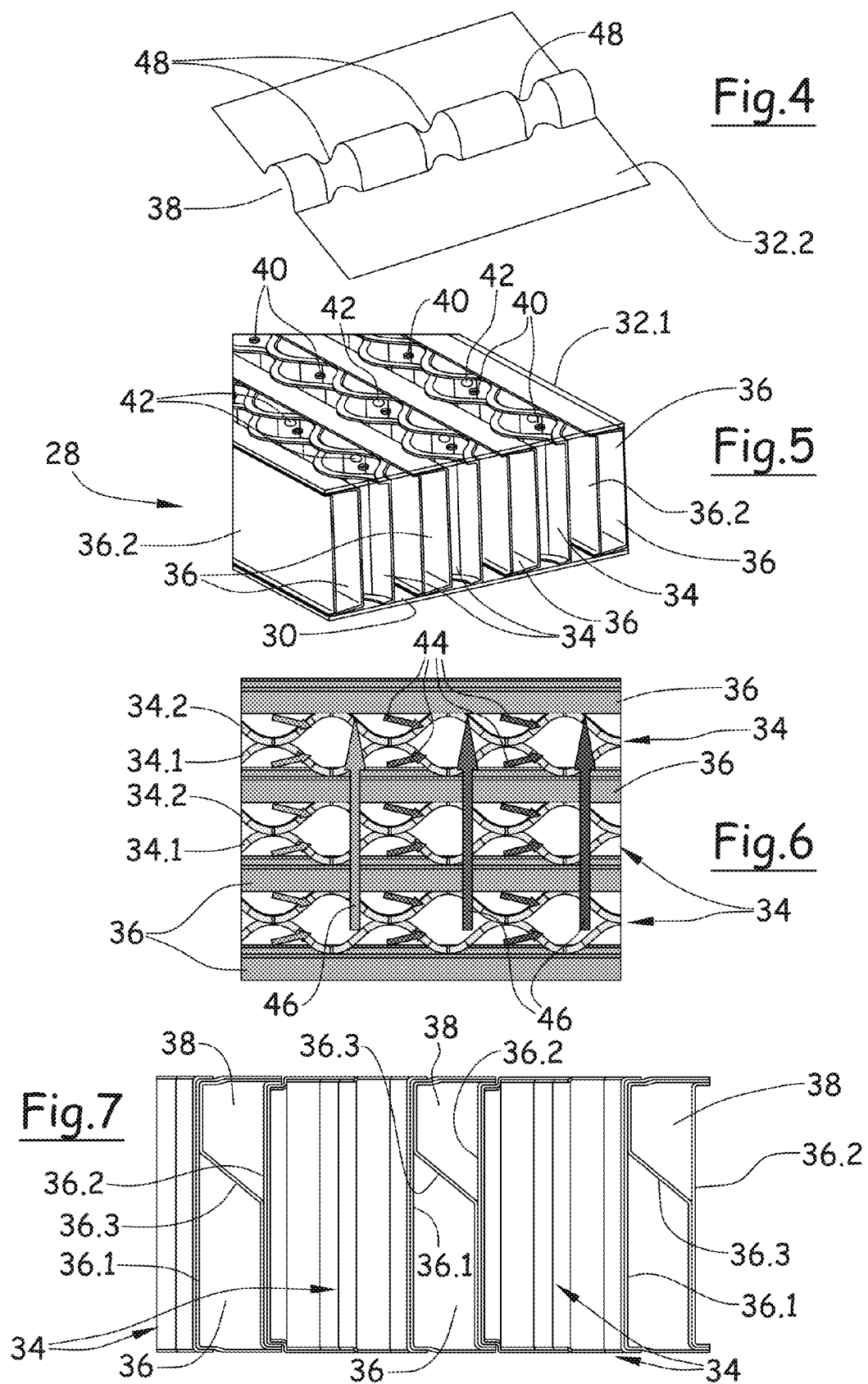

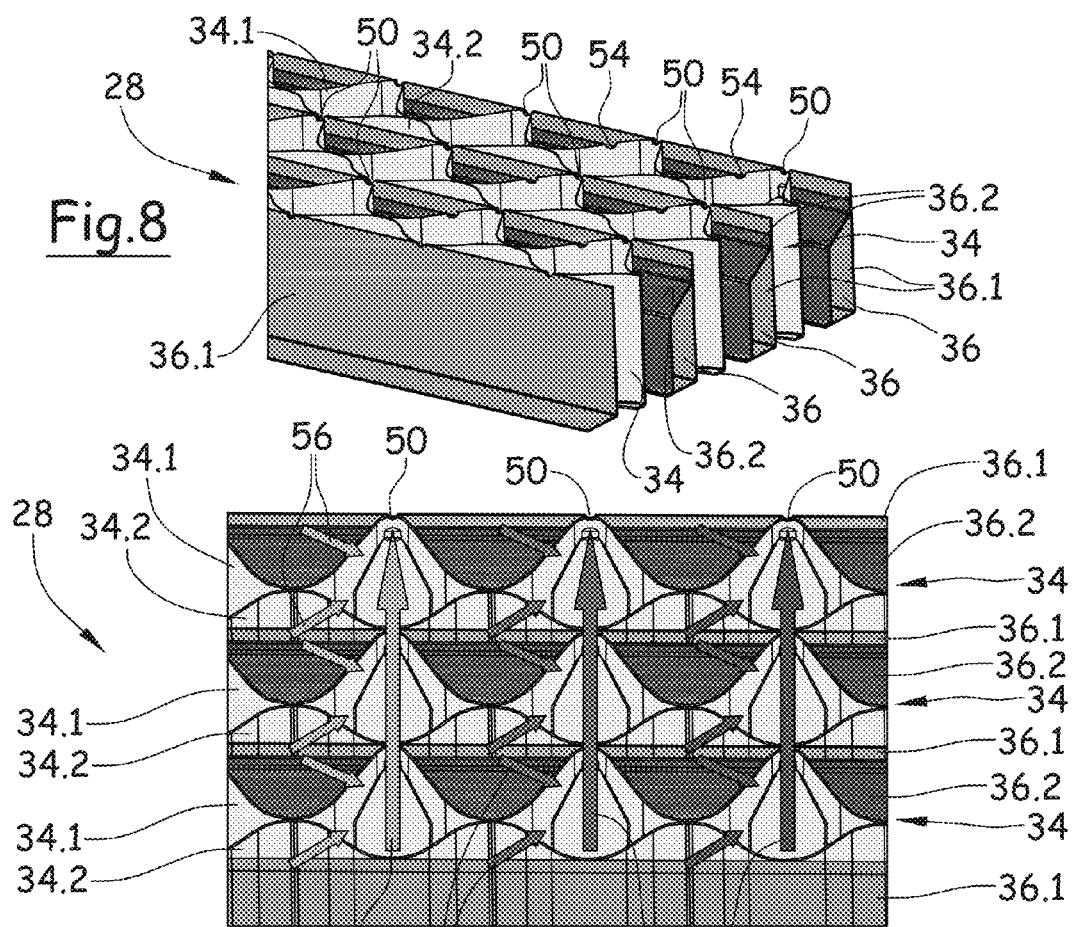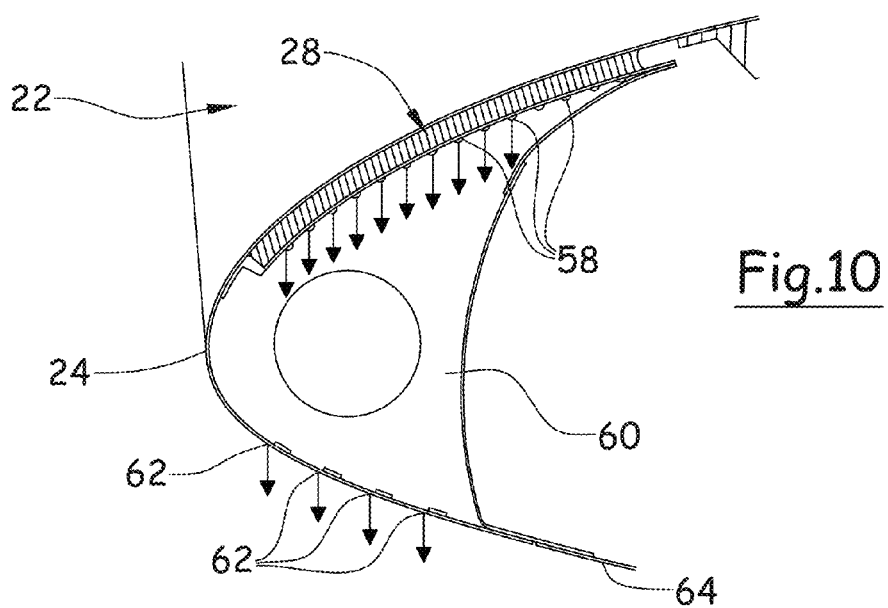

ACOUSTIC PROCESSING PANEL, MORE PARTICULARLY ADAPTED FOR AN AIR INTAKE IN AN AIRCRAFT NACELLE

FIELD OF THE INVENTION

This invention relates to an acoustic treatment panel that is more particularly suited to an air intake of an aircraft nacelle.

BACKGROUND OF THE INVENTION

Techniques have been developed for reducing the noise emitted by an aircraft and in particular the noise emitted by a propulsion system, by using, at the walls of the pipes, panels (also called coatings or structures) whose purpose is to absorb a portion of the sound energy, in particular by using the principle of Helmholtz resonators. In a known manner, an acoustic treatment panel comprises—from the outside to the inside—an acoustically resistive porous layer, at least one alveolar structure, and a reflective or impermeable layer.

Layer is defined as one or more layers that may or may not be of the same type.

The acoustically resistive porous layer is a porous structure that plays a dissipative role, partially transforming the acoustic energy from the sound wave that passes through it into heat. It comprises so-called open zones that are able to allow acoustic waves to pass and other so-called closed or filled zones that do not allow sound waves to pass but are intended to ensure the mechanical resistance of said layer. This acoustically resistive layer is characterized in particular by an open surface ratio that essentially varies based on the engine and components constituting said layer.

The alveolar structure is delimited by a first imaginary surface to which the acoustically resistive porous layer can be connected directly or indirectly and by a second imaginary surface to which the reflective layer can be connected directly or indirectly, and said structure comprises a number of pipes that empty, on the one hand, at the level of the first surface, and, on the other hand, at the level of the second surface. These pipes are blocked by, on the one hand, the acoustically resistive porous layer, and, on the other hand, the reflective layer in such a way as to form a cell.

A honeycomb can be used to form the alveolar structure. Different types of materials can be used for forming the honeycomb.

When the acoustic panel is installed at an air intake of a nacelle, this acoustic panel is also to be compatible with a frost treatment. Frost treatment is defined as a process or a system that makes it possible to prevent the formation and/or the accumulation of ice and/or frost.

The documents EP-1,232,944 and EP-1,232,945 describe panels for the acoustic treatment that is compatible with a frost treatment that uses hot air. In this case, the alveolar structure comes in the form of bands of cells spaced apart or a number of pipes spaced apart.

This frost treatment is generally coupled to a drainage system that makes it possible to remove the water that can accumulate in the cells of the alveolar structure, in particular in the cells that are located in a zone that extends from 3 o'clock to 9 o'clock.

This drainage of the water is necessary for limiting the risks of deterioration of the cells of the alveolar structure due to the gel of the accumulated water, for preventing corrosion problems, and for maintaining the acoustic performance levels.

According to one embodiment, the side walls of the cells comprise cutaways in the upper portion or in the lower portion in such a way as to link the cells to one another, with the cells located at 6 o'clock comprising openings at the reflective layer in such a way as to remove the water from the acoustic treatment panel.

This embodiment is not completely satisfactory because the presence of a drainage system coupled to a frost treatment system with hot air tends to cancel out the acoustic treatment and to generate a stream that is disrupted at the stream of air entering the nacelle.

Also, the purpose of this invention is to remedy the drawbacks of the prior art by proposing an acoustic treatment panel incorporating a frost treatment and a drainage system optimizing the yield of the three functions, namely acoustic treatment, frost treatment, and drainage.

SUMMARY OF THE INVENTION

For this purpose, the invention has as its object an acoustic treatment panel that is connected to an air intake of an aircraft nacelle, whereby said panel comprises at least one acoustically resistive structure and a reflective layer, between which are located—in a direction that is essentially perpendicular to the longitudinal direction of the nacelle—bands of alveolar cells spaced in such a way as to allow the passage of hot air provided for a frost treatment, characterized in that it comprises pipes for hot air that are each delimited by at least one partition that extends from the acoustically resistive layer up to the reflective layer in such a way as to insulate said bands of cells in the longitudinal direction.

BRIEF DESCRIPTION OF THE DRAWINGS

Other characteristics and advantages will emerge from the following description of the invention, a description that is provided only by way of example, relative to the accompanying drawings, in which:

FIG. 4 is a perspective view that illustrates in detail a drain pipe according to one embodiment, FIG. 5 is a perspective view that illustrates through a transparency the openings for removing water according to the embodiment illustrated in FIG. 3, FIG. 6 is a top view that illustrates the stream of liquids in an acoustic treatment panel according to one embodiment of the invention, FIG. 7 is a cutaway that illustrates a panel according to a second embodiment of the invention without the reflective and acoustically resistive layers, FIG. 8 is a perspective view of a portion of a panel without the reflective layer according to a third embodiment of the invention, FIG. 9 is a perspective view of the top of the panel that is illustrated in FIG. 8, FIG. 10 is a cutaway along a longitudinal plane of the lower part of the front of a nacelle according to the invention.

DETAILED DESCRIPTION OF THE DRAWINGS

Figure 1:
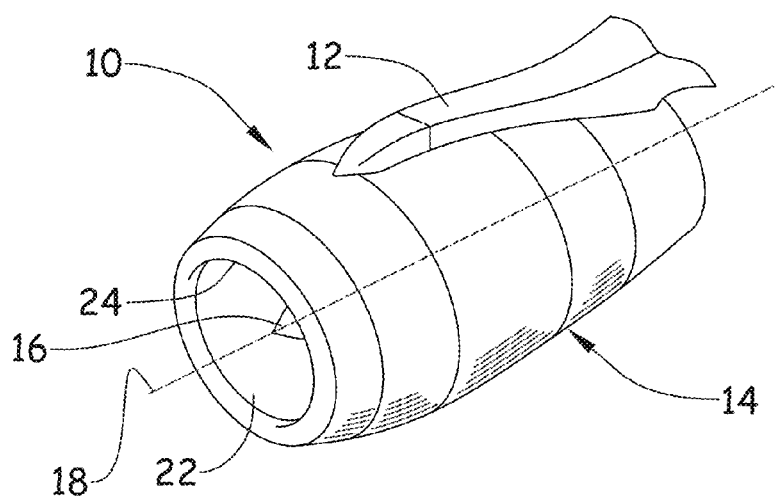
FIG. 1 is a perspective view of an aircraft nacelle.
Figure 2:
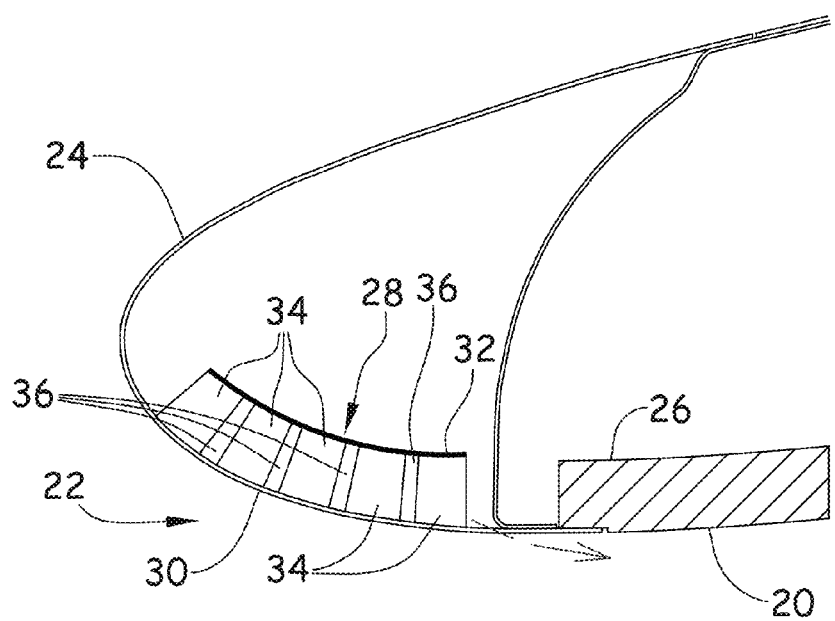
FIG. 2 is a cutaway along a longitudinal plane of the upper portion of the front of a nacelle.
Figure 3:
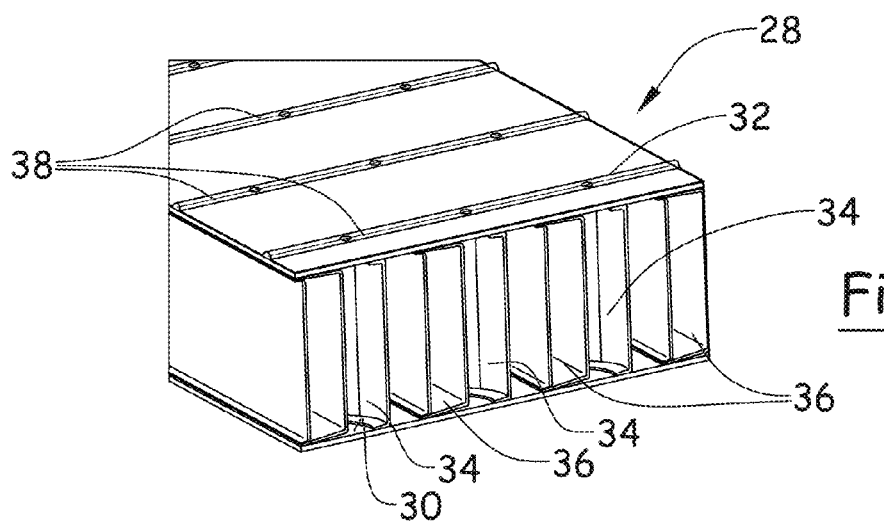
FIG. 3 is a perspective view of a panel according to a first embodiment of the invention.

FIG. 1 shows a propulsion system 10 of an aircraft that is connected below the wing by means of a mast 12. However, this propulsion system could be connected to other zones of the aircraft.

This propulsion system comprises a nacelle 14 in which a power plant that drives a fan mounted on its shaft 16 is arranged in an essentially concentric manner. For the description, the longitudinal direction corresponds to that of the axis of the nacelle that is referenced 18. The planes that are perpendicular to the longitudinal direction are called transverse planes.

The nacelle 14 comprises a wall 20 that delimits a pipe with an air intake 22 at the front, a first portion of the incoming air stream, called the primary stream, passing through the power plant to participate in the combustion, and the second portion of the air stream, called the secondary stream, being driven by the fan and flowing into an annular pipe that is delimited by the inside wall 20 of the nacelle and the outside wall of the power plant.

The front part 24 of the air intake 22, also called lip, describes an essentially circular shape that extends in a plane that can be essentially perpendicular to the longitudinal axis 18, or not perpendicular, with the frontal part located just before 12 o'clock. However, other air intake forms can be considered.

According to the dimensions of the nacelle, the air intake can comprise a first small radius of curvature that corresponds essentially to the radius of the pipe 20 in a plane that is perpendicular to the longitudinal direction as well as a second small radius of curvature in a longitudinal plane, in particular between the pipe 20 and the leading edge of the air intake 22 of the nacelle.

Hereinafter, aerodynamic surface is defined as the shell of the aircraft that is in contact with the aerodynamic streams.

To limit the impact of the noise pollution, an acoustic treatment panel 26—whose purpose is to absorb a portion of the sound energy, in particular by using the principle of Helmoltz resonators—is provided, in particular at the aerodynamic surfaces of the inside wall 20. In a known manner, this acoustic treatment panel comprises—from the inside to the outside—a reflective layer, at least one alveolar structure, and at least one acoustically resistive structure.

In addition, an acoustic treatment panel 28 is provided at the air intake 22.

According to the invention, the acoustic treatment panel 28 comprises an acoustically resistive structure 30 and a reflective layer 32 between which the following are alternately located in a direction that is essentially perpendicular to the longitudinal direction: bands 34 of alveolar cells and pipes 36 for the insulating hot air in the longitudinal direction of said bands 34 of cells, as well as drain pipes 38 that ensure the removal of liquids that are located against the reflective layer so as not to disrupt the operation of the acoustically resistive layer 30.

According to the invention, the pipes 36 form a circuit for the hot air of defrosting that is independent and insulated by a circuit that consists of drain pipes 38 in such a way as not to disrupt the operation of the acoustic treatment and the laminarity of the flows at the air intake. Actually, if these two circuits were not independent and perfectly insulated, the pressure gradients at the acoustically resistive layer 30 would generate air circulations in the panel that would be likely to minimize the effect of acoustic treatment and to create disruptions at the flows that enter the nacelle.

The drain pipes 38 cannot be provided over the entire circumference of the air intake but only at zones between 3 o'clock and 9 o'clock.

The alveolar cell bands 34 are insulated from one another in such a way as to not allow a flow of air between two points that are spaced in the longitudinal direction provided in two different bands. Consequently, this arrangement makes it possible to optimize the acoustic treatment and to limit the risks of disruptions of the air stream entering the pipe 20 appearing because of the intake of air inside the structure for the acoustic treatment because of negative pressure at a first point and its return outside of said structure at a second point.

According to an embodiment that is illustrated in FIGS. 5 to 9, each band 34 of alveolar cells comprises at least two corrugated side walls 34.1 and 34.2 that extend between the acoustically resistive structure 30 and the reflective layer 32, with dropped edges to ensure a satisfactory joint with said acoustically resistive structure 30 and said reflective layer 32, with the side walls 34.1 and 34.2 being arranged in such a way that the undulations are essentially symmetrical relative to the plane of contact of said side walls 34.1 and 34.2.

Figure 11:
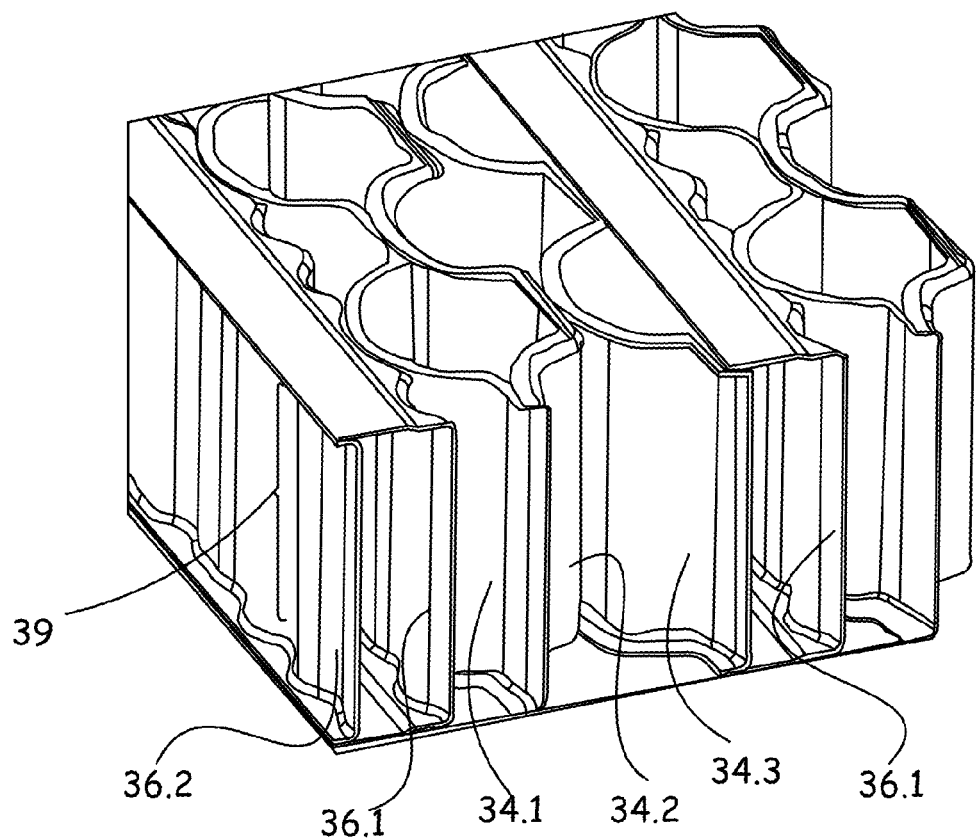
FIG. 11 is a perspective view of a portion of a panel without a reflective layer according to a fourth embodiment of the invention.
Figure 12:
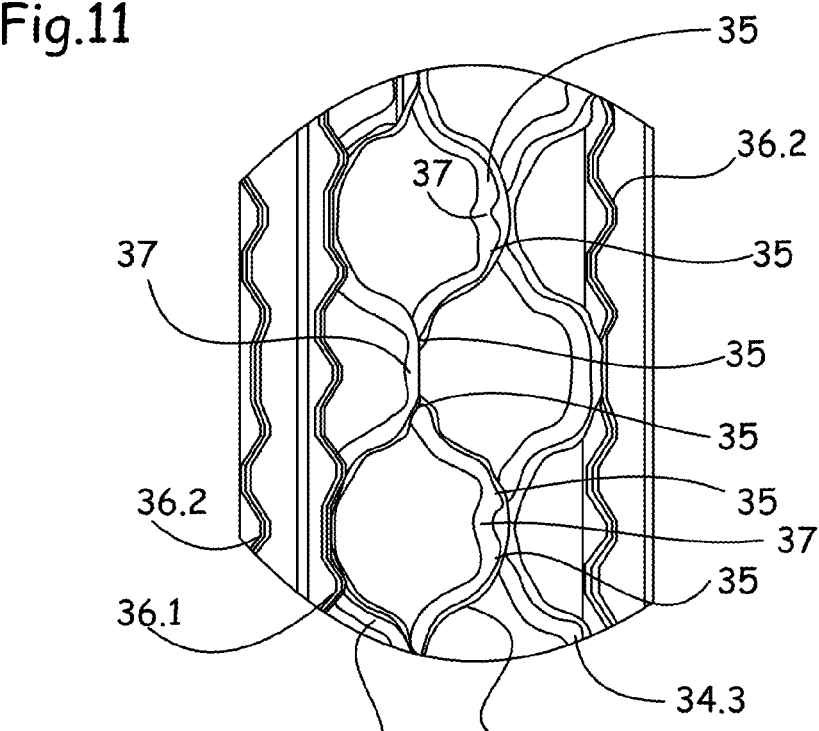
FIG. 12 is a top view of the panel that is illustrated in FIG. 11.

According to another embodiment illustrated in FIGS. 11 and 12, each band 34 of alveolar cells comprises three corrugated side walls 34.1 to 34.3 that extend between the acoustically resistive structure 30 and the reflective layer 32, with dropped edges to ensure a satisfactory joint with said acoustically resistive structure 30 and said reflective layer 32.

Advantageously, each wall has a wavy shape that successively comprises a hollow shape and a projecting shape. To form the cells, the walls 34.1, 34.2 and 34.3 all have the same span (a hollow shape and a projecting shape), and the hollow shapes of the wall 34.2 are in contact with the projecting shapes of the wall 34.1 whereas the projecting shapes of the wall 34.2 are in contact with the hollow shapes of the wall 34.3.

To improve the sealing between the cells, the projecting shapes comprise a double undulation with two peaks 35 framing a trough 37. The radius of curvature of the trough 37 of the projecting shape of a wall is essentially identical to the one of the hollow shape of the adjacent wall in such a way as to increase the contact surface between the two walls and to obtain a longer escape path between two adjacent cells and therefore a better seal between said two cells.

Each pipe 36 is delimited by at least one partition, generally two partitions 36.1 and 36.2, of which at least one extends between the acoustically resistive structure 30 and the reflective layer 32 in such a way as to insulate two alveolar cell bands 34 in a longitudinal direction.

According to embodiments that are illustrated in FIGS. 5 and 7, the two partitions 36.1 and 36.2 extend from the reflective layer 32 to the acoustically resistive layer 30. One of the two partitions 36.1 has a C shape, with wings whose dimensions are suited to the width of the pipe 36, with one wing being flattened against the acoustically resistive layer 30, and the other against the reflective layer 32. The other partition 36.2 comprises dropped edges in such a way as to ensure an essentially airtight connection with the ends of the wings of the other partition 36.1 and thus to delimit the pipe 36.

According to one embodiment that is illustrated in FIG. 7, the pipe that is delimited by the partitions 36.1 and 36.2 is split by a third partition 36.3 into two pipes, a first pipe 36 for the hot air in contact with the acoustically resistive layer 30, and a second drain pipe 38 in contact with the reflective layer 32.

According to another embodiment that is illustrated in FIGS. 8 and 9, only one of the partitions 36.1 extends from the acoustically resistive layer 30 up to the reflective layer 32. Preferably, this partition 36.1 has an L shape. The second partition 36.2 comprises a first edge that is connected to one end of a wing of the first partition 36.1 and a second edge that is connected to the other wing of the first partition 36.1 in an offset manner relative to its end so that the alveolar cell bands are separated only by a single partition 36.1.

According to another embodiment that is illustrated in FIGS. 11 and 12, at least one of the partitions 36.1, 36.2—and preferably two partitions—has a wavy profile, in a plane that is parallel to the reflective layer, at the central part 39. This configuration makes it possible for partitions to better withstand forces exerted by the pressure of the fluid that circulates in the pipe 36. It also ensures a better stability and increases the resistance to the compression. It also limits the vibrations of the pipe 36 and assists in formability.

The fact that the bands 34 are located in a direction that is essentially perpendicular to the longitudinal direction and the presence of at least one partition 36.1 between the alveolar cells of the two consecutive band 34 makes it possible to insulate said cells and limits the risks of a stream appearing inside the acoustic treatment panel between two distant points in the longitudinal direction and separated by at least one partition 36.1. This arrangement makes it possible not to diminish the effects of acoustic treatment.

The pipes 36 can be connected at their ends by collectors, one provided for the intake of hot air coming from the engine and another for the removal of hot air after the treatment of frost. However, the invention is not limited to this arrangement, with the pipes 36 being supplied with hot air by any suitable means.

Preferably, the pipes 36 for hot air are essentially rectilinear for limiting pressure drops.

The fact of arranging them in planes that are essentially perpendicular to the longitudinal direction makes it possible to simplify the circulation of the hot air and limits the increased consumption of the aircraft as well as the mechanical constraints in the pressurized zone.

Preferably, the pipes 36 have a width that is between 5 and 35 mm.

According to one embodiment that is illustrated in FIG. 7, the drain pipes 38 are provided between the alveolar cell bands 34 and extend in a direction that is essentially perpendicular to the longitudinal direction.

In this case, for each alveolar cell band 34, drain openings are made at one of the partitions 36.1 or 36.2 in such a way that the liquids exit from the cells and are removed in the direction of the adjacent drain pipe 38. The cells that are not in contact with a drain pipe 38 communicate with cells that are in contact.

In any case, all of the cells of the same band communicate directly or indirectly (by means of other cells) with the same drain pipe 38. This arrangement makes it possible to insulate the cells of two different bands 34.

According to another embodiment illustrated in FIGS. 3 to 6, the reflective layer 32 comprises two attached skins, with a first skin 32.1 in contact with the alveolar cell bands 34 comprising drain openings 40 that make it possible to link certain cells with a drain pipe 38 that is made between the first skin 32.1 and the second skin 32.2.

As illustrated in FIG. 5, the cells that do not communicate directly with the pipe 38 each comprise—at a side wall—an opening 42 for communication with a cell that communicates with the pipe 38. In FIG. 6, the stream of liquids between two cells is shown at 44, and the direction of the flow of liquids in the pipes 38 is shown at 46.

According to this embodiment, the drain pipes 38 extend in a direction that is essentially longitudinal and are connected at their ends by collector pipes that extend in a direction that is essentially perpendicular to the longitudinal direction.

Contrary to the pipes 36 for the hot air that have a large cross-section for achieving an effective frost treatment, the drain pipes 38 have a reduced cross-section that limits the flow rates of air from one point to the next. This arrangement makes it possible to limit the flow rates of air between two bands 34 even if the drain pipes extend in the longitudinal direction.

As illustrated in FIG. 4, the pipes 38 preferably have cross-sections that are variable over their length, with at least one bottleneck 48, preferably made between two consecutive openings 40. This arrangement makes it possible to have a large cross-section for the pipe 38 to the right of the openings 40 in such a way as to simplify the adjustments while limiting the flow rate of the possible streams of air between the alveolar cells of two different bands 34.

By way of example, the drain pipes 38 are spaced on the order of 5 to 35 mm.

According to another embodiment that is illustrated in FIGS. 8 and 9, the drain pipes 38 consist of alveolar cells that are connected to one another in such a way as to form a network of drain pipes.

In this case, the pipes 36 for the hot air do not extend over the entire height of the panel, and the bands 34 are insulated by a single partition 36.1. The bands 34 comprise two corrugated side walls 34.1 and 34.2, with one of them 34.1 comprising a cutaway that is adapted to the pipe 36 and that is in contact with a partition 36.1 on only one portion of the height.

The pipes 38 can be filled with hydrophobic porous materials (carbon fibers, glass fibers, . . . ) that make possible the circulation of the water in the pipes while increasing the resistance to the circulation of air in said pipes.

According to this embodiment, at zones where the side walls 34.1 and 34.2 are in contact on either side of a partition 36.1, the panel comprises openings 50 that make it possible to link the cells of adjacent bands in such a way as to generate a stream 52 of liquids in the longitudinal direction. The cells that are delimited by a side wall and the partition 36.1 are equipped with openings 54 that make it possible to create flows 56 for removing the liquids in the direction of a cell that is delimited by two side walls.

The openings 50 have a reduced cross-section in such a way as to form a bottleneck for limiting the air flow between the cells of different bands 34.

The embodiment that is illustrated in FIGS. 7 and 8 has the advantage of not perforating the reflective layer 32.

As illustrated in FIG. 10, the liquids that are drained by the drain pipes 38 are directed toward the lower part of the panel. At this level, the network of pipes 38 comprises at least one drain opening 58 that makes it possible for the liquids to flow into the cavity 60 of the leading edge, to then be expelled toward the outside by openings 62 made at the outside wall 64 of the nacelle.

The invention claimed is:

1. An acoustic treatment panel that is connected to an air intake of an aircraft nacelle, whereby said panel comprises at least one acoustically resistive structure (30) and a reflective layer (32), between which are located—in a direction that is essentially perpendicular to the longitudinal direction (18) of the nacelle—bands (34) of alveolar cells spaced in such a way as to allow the passage of hot air provided for a frost treatment, the panel further comprising pipes (36) for hot air that are each delimited by at least one partition (36.1) that extends from the acoustically resistive layer (30) up to the reflective layer (32) in such a way as to insulate said bands (34) of cells in the longitudinal direction.

2. The acoustic treatment panel according to claim 1, wherein each pipe (36) comprises two partitions (36.1, 36.2) that extend from the reflective layer (32) to the acoustically resistive layer (30), a first partition (36.1) that has a C shape with wings, with the second partition (36.2) comprising dropped edges in such a way as to ensure an essentially tight connection with the ends of the wings of the first partition (36.1).

3. The acoustic treatment panel according to claim 2, further comprising a third partition (36.3) in such a way as to delimit—with the first and second partitions (36.1, 36.2)—two pipes, a first pipe (36) for the hot air in contact with the acoustically resistive layer (30) and a second drain pipe (38) in contact with the reflective layer (32).

4. The acoustic treatment panel according to claim 1, wherein each pipe (36) comprises a first partition (36.1) with an L shape that extends from the reflective layer (32) up to the acoustically resistive layer (30) and a second partition (36.2) of which a first edge is connected to one end of a wing of the first partition (36.1) and of which a second edge is connected to another wing of the first partition (36.1) in an offset manner relative to its end so that the bands of alveolar cells are separated only by a single partition (36.1).

5. The acoustic treatment panel according to claim 2, wherein at least one of the partitions (36.1, 36.2) of a pipe (36) has a wavy profile in a plane that is parallel to the reflective layer.

6. The acoustic treatment panel according to claim 2, wherein a band (34) of alveolar cells comprises at least two wavy walls (34.1, 34.2, 34.3), with the projecting shapes of a wall being in contact with the hollow shapes of the adjacent band in such a way as to delimit the cells.

7. The acoustic treatment panel according to claim 6, wherein the projecting shapes comprise a double undulation with two peaks (35) framing a trough (37) whose radius of curvature is essentially identical to the one of the hollow shape of the adjacent wall in such a way as to increase the contact surface between the two walls.

8. An aircraft nacelle that comprises an acoustic treatment panel according to claim 1.

9. The acoustic treatment panel according to claim 3, wherein a band (34) of alveolar cells comprises at least two wavy walls (34.1, 34.2, 34.3), with the projecting shapes of a wall being in contact with the hollow shapes of the adjacent band in such a way as to delimit the cells.

10. The acoustic treatment panel according to claim 4, wherein a band (34) of alveolar cells comprises at least two wavy walls (34.1, 34.2, 34.3), with the projecting shapes of a wall being in contact with the hollow shapes of the adjacent band in such a way as to delimit the cells.

11. The acoustic treatment panel according to claim 3, wherein at least one of the partitions (36.1, 36.2) of a pipe (36) has a wavy profile in a plane that is parallel to the reflective layer.

12. The acoustic treatment panel according to claim 4, wherein at least one of the partitions (36.1, 36.2) of a pipe (36) has a wavy profile in a plane that is parallel to the reflective layer.

* * * * *